Oct. 21, 1952  J. MARKOWITZ  2,614,471
CAMERA AND LAMP SUPPORTING DEVICE
Filed March 30, 1950  3 Sheets-Sheet 1

INVENTOR
JOSEPH MARKOWITZ
BY
J. B. Felshin
ATTORNEY

Oct. 21, 1952          J. MARKOWITZ          2,614,471
CAMERA AND LAMP SUPPORTING DEVICE
Filed March 30, 1950          3 Sheets-Sheet 2
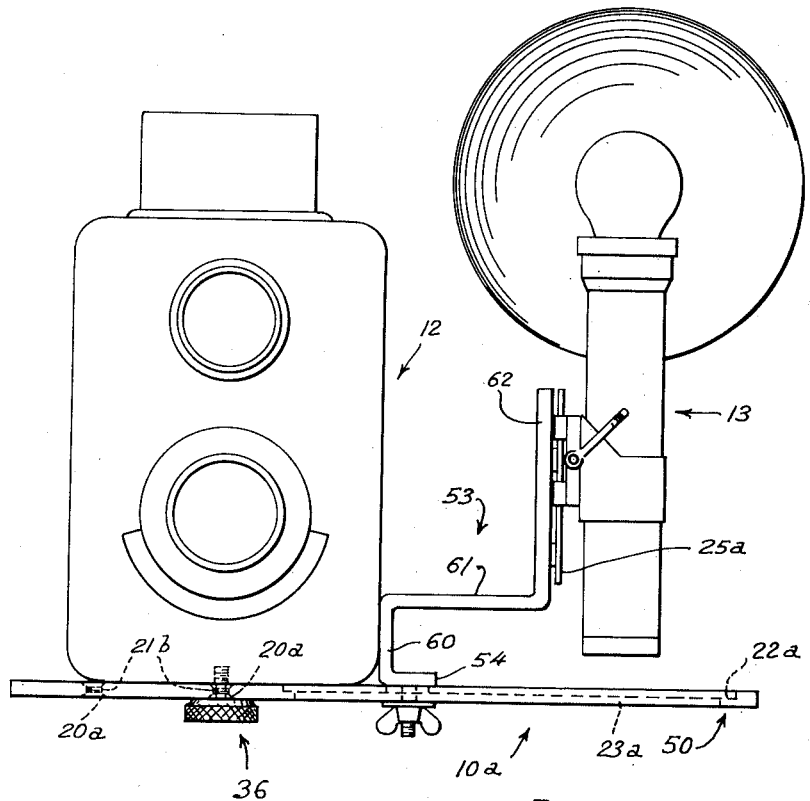
FIG.4
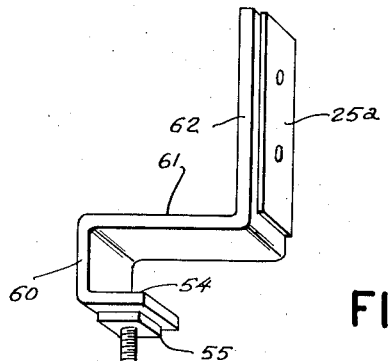
FIG.5
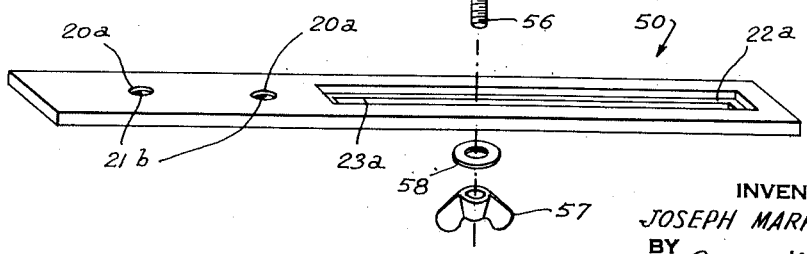
INVENTOR
JOSEPH MARKOWITZ
BY
*J. B. Felshin*
ATTORNEY Oct. 21, 1952        J. MARKOWITZ        2,614,471

CAMERA AND LAMP SUPPORTING DEVICE

Filed March 30, 1950        3 Sheets-Sheet 3

INVENTOR
JOSEPH MARKOWITZ
BY
*J. B. Felshin*
ATTORNEY

Patented Oct. 21, 1952

2,614,471

UNITED STATES PATENT OFFICE 2,614,471

CAMERA AND LAMP SUPPORTING DEVICE

Joseph Markowitz, New York, N. Y.

Application March 30, 1950, Serial No. 152,816

6 Claims. (Cl. 95—86)

This invention relates to camera and lamp supporting devices.

It has been known to provide a support on which a camera is mounted and which support likewise supports a lamp or lamps for illuminating the subject to be photographed. In taking pictures with such apparatus the operator often holds the support in his hands, and when the camera shutter is actuated it has been known that often movement occurs either between the camera and the support or between the illuminating means and the support or both, thereby spoiling the photograph.

It is therefore an object of the present invention to provide a support for a camera and lamp having highly improved means to prevent movement of a camera relative to the support, so as to obviate the difficulty experienced with the prior camera supporting devices described hereinabove.

Another object of this invention is to provide a device of the character described comprising a support on which the camera is mounted and on which the illuminating means is mounted, and an additional bracket slidably mounted on the support and movable into engagement with the camera, means being further provided to fix said bracket to the support in adjusted position so as to hold the camera against movement relative to the support, and to accommodate cameras of various sizes.

Yet another object of this invention is to provide a support on which the bottom of the camera rests with screw threaded means on the support for pressing the camera to the support, and means adapted to be fixed to the support in various adjusted positions and including an arm engaging the side of the camera so as to prevent turning of the camera relative to the support.

Still another object of this invention is to provide a device of the character described comprising a member on which the bottom of the camera rests, a screw rotatably mounted on said member and having threaded engagement within a threaded opening in the bottom of the camera for clamping the camera down on to said member, and an angle shaped member having one arm slidably mounted on said member and another arm adapted to contact the side of the camera, and means to clamp said first arm to said member in various adjusted positions.

Yet another object of this invention is to provide a strong, rugged and durable camera and lamp support which will firmly and rigidly support the camera and lamp against shaking, and which shall be easy to manipulate, inexpensive to manufacture, easy to assemble, and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims:

In the accompanying drawings in which is shown various illustrative embodiments of this invention, Fig. 1 is a front elevational view of a camera, photographic flashlight and support mechanism embodying the invention;

Fig. 4 is a front elevational view of a camera, photographic flashlight and support mechanism embodying a modification of the invention;

Fig. 5 is an exploded perspective view of the modified support mechanism shown in Fig. 4;

Figure 1:
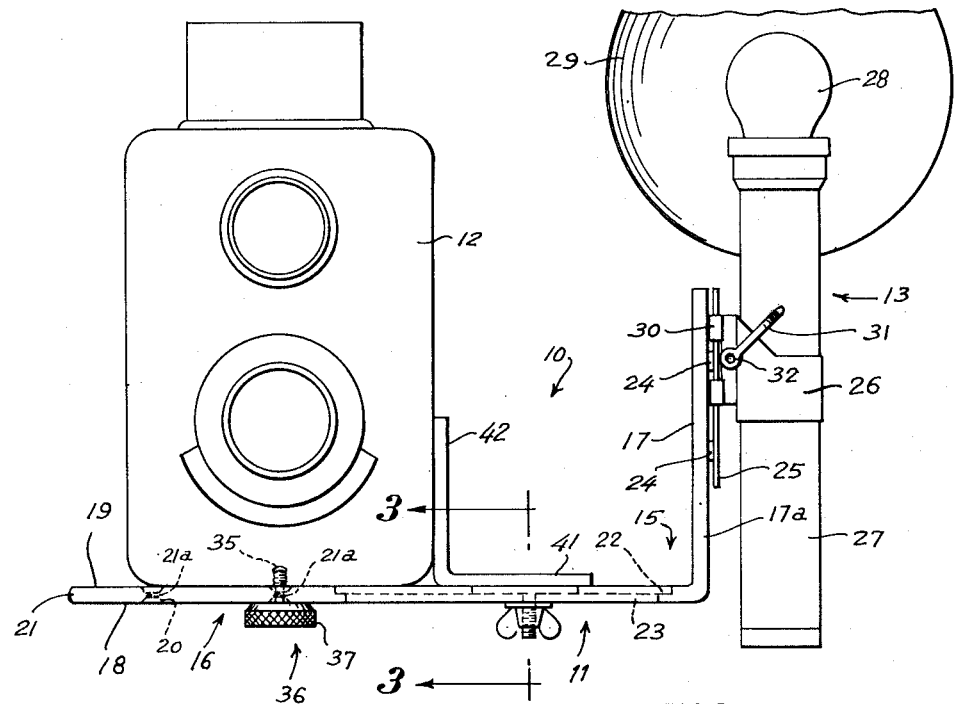
Figure 2:
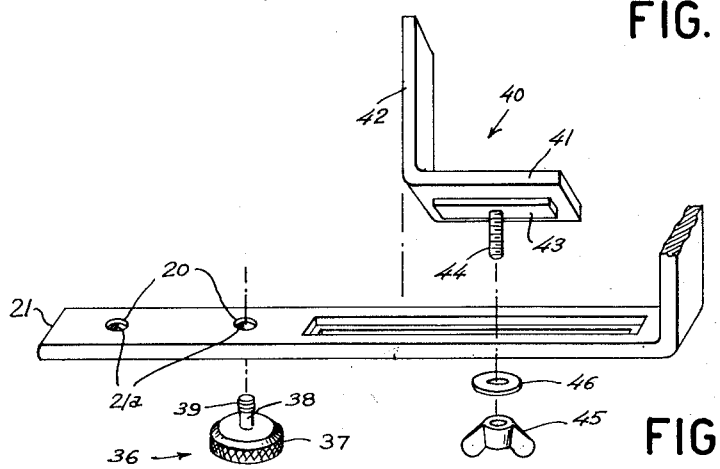
Fig. 2 is an exploded perspective view of a portion of the support mechanism shown in Fig. 1.
Figure 3:
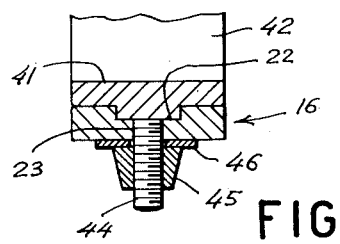
Fig. 3 is a partial enlarged cross-sectional view taken on line 3—3 of Fig. 1.

Referring now in detail to the drawings, and particularly to Figs. 1, 2 and 3 thereof, 10 designates apparatus embodying the invention. The same comprises a support 11 on which are mounted, in the manner hereinafter to be described, a camera 12 and a photographic flashlight 13. The support 11 comprises an angle shaped member 15 having a horizontal arm 16 from one end of which extends upwardly, a vertical arm 17. The member 15 may be made from a single elongated, flat bar of metal of oblong cross-section. The arm 16 has a bottom surface 18 and a top surface 19. It is formed with a pair of longitudinally spaced through openings 20, one of which is closer to one end 21 of the arm 16 than the other. Each opening 20 is countersunk at the top and bottom and has an intermediate screw threaded portion 21a. Said arm 16 is furthermore formed in its upper face with an elongated recess 22, and the recessed surface is formed with a longitudinal slot 23 terminating short of the ends of the recess and of less width than said recess.

Attached to the arm 17 are a pair of spaced outwardly extending horizontal rivets 24 supporting a vertical plate or rail 25, parallel to and spaced from the outer face 17a of the arm 17. Mounted on the plate 25 is the usual or conventional photographic flashlight gun 13, of well known construction. The same comprises a sleeve 26 surrounding a battery case 27 in the upper end of which is mounted the usual flash bulb 28. A reflector 29 is attached to the case 27 in the usual manner. On the sleeve 26 are the usual plate gripping fingers 30 which slidably engage opposite edges of the plate 25. Means is further provided, including an arm 31 mounted on the screw threaded bolt 32, for tightening the grip fingers 30 on the plate. The sleeve 26 with its grip fingers and the tightening means 31, 32 are well known in the art.

The camera 12 may be of any conventional type. It is provided with an opening 35 in the bottom thereof to facilitate attachment of the camera to arm 16 of the bracket 15. The attachment is effected by a member 36 having a head 37 knurled at its outer surface so that it can be rotated. Extending upwardly from the head 37 is a shank 38 at the upper end of which is a screw threaded portion 39. The screw threaded portion 39 may be screwed within and through the threaded portion 21a of the opening 20. After the screw threaded portion 39 has been screwed past the threaded portion 21a, member 36 is rotatably mounted and has a vertically sliding movement relative to the bar 16. The screw threaded portion 39 can then be screwed into the opening 35 in the bottom of the camera, thereby pressing the head 37 against the underside of arm 16 and pressing the camera down against the top of the bar.

It will be noted that member 36 is engaged in one of the openings 20. However, it could be engaged in either opening. Some cameras have threaded openings both in the bottom and in one side thereof, so that the camera could be mounted on member 11 either in upright position or on one side.

Sometimes the clamping screw 36 is not tightened sufficiently and the camera has a tendency to turn, rotate or move on the support. Means is therefore provided to prevent such movement. To this end there is mounted on the arm 16 of member 15 an angle shaped bracket 40. Said bracket 40 comprises a horizontal arm 41 from which extends upwardly a vertical arm 42. The arm 41 rests on top of arm 16. At the underside of arm 41 is a longitudinal boss 43 which is slidably mounted within the recess 22. Extending downwardly from the boss 43 is a screw threaded stem 44 which projects downwardly through the slot 23. Screwed to the lower end of the stem 44 is a wing nut 45. A washer 46 may be interposed between the wing nut and the underside of arm 16.

It will be now understood that member 40 may be longitudinally moved relative to arm 16. It is moved to a position where the vertical arm 42 contacts a side of the camera. The wing nut 45 is then tightened to insure against rotation of the camera relative to the support. With such construction if the photographer holds the support in his hands there is no likelihood of the camera moving when the shutter is actuated.

Referring now to Figs. 4 and 5 there is shown an apparatus 10a embodying the invention and illustrating a modified construction. The apparatus 10a comprises a horizontal bar 50 provided with openings 20a similar to openings 20, each being formed with a screw threaded portion 21b similar to the threaded portions 21a. The bar 50 is also formed with a longitudinal recess 22a similar to the recess 22 and with a longitudinal slot 23a similar to the slot 23. The camera 12 is mounted on the bar 50 and may be clamped thereto by means of the clamping screw 36, the same as in apparatus 10. In the apparatus 10a however, there is provided a bracket 53 having a dual function, as will be described hereinafter, of preventing turning of the camera 12 relative to the bar 50 and also of supporting the photographic flashlight 13.

Member 53 comprises a horizontal arm 54 contacting the top of the bar 50. At the bottom of the arm 54 is a boss 55 slidably received in the groove 22a. Extending therefrom is a screw threaded stem 56 passing through the slot 23a. A wing nut 57 is screwed to the lower end of the stem. Interposed between the wing nut and bar 50 is a washer 58. Thus, by tightening the wing nut, member 53 is clamped to the bar 50 in adjusted position. Extending upwardly from the arm 54 is a vertical arm 60. Member 53 may be adjusted to bring the arm 60 into contact with the side of the camera. Extending from the vertical arm 60 is horizontal arm 61 parallel to arm 54 but extending therebeyond. Extending upwardly from the arm 61 is a vertical arm 62 to which is attached a plate 25a similar to plate 25 in Fig. 1 and on which the photographic flashlight 13 is mounted. It will now be understood that member 53 serves to steady the camera 12 on bar 50 and likewise serves as a support for the photographic flashlight 13.

Figure 6:
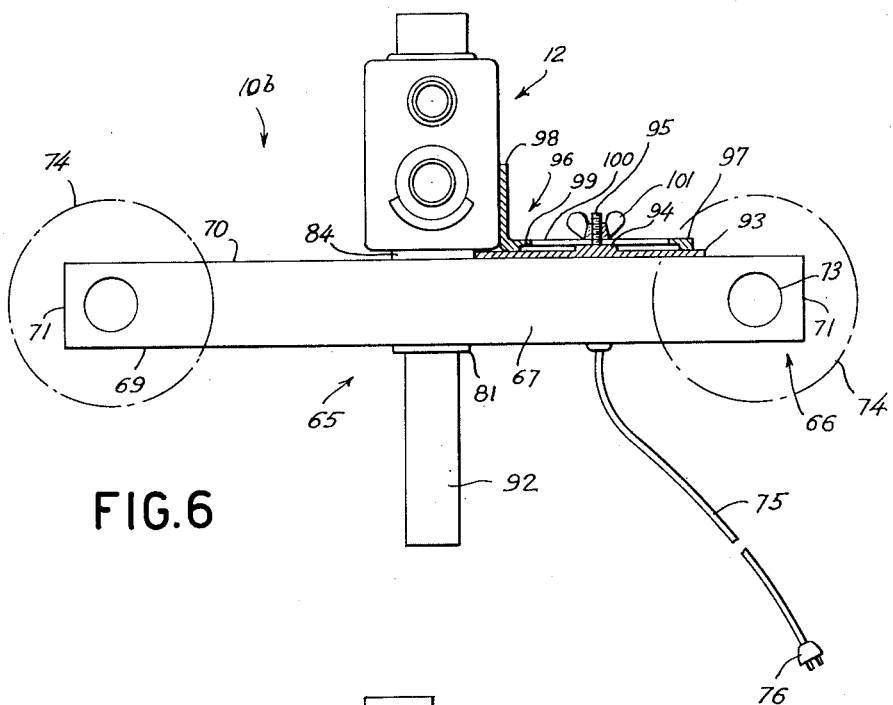
Fig. 6 is a front elevational view of a camera mounted on a portable photoflood holder showing another modification of the support mechanism embodying the invention.
Figures 7, 8:
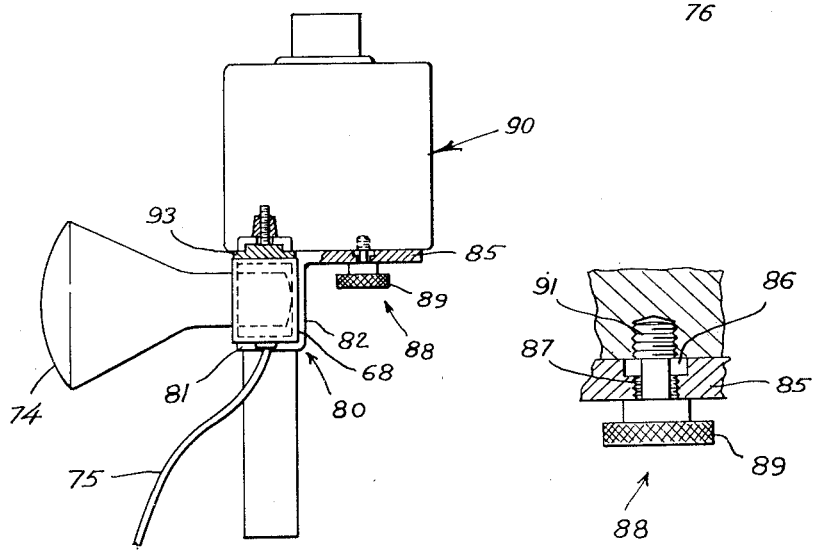
Fig. 7 is a side elevational view of the arrangement shown in Fig. 6.
Fig. 8 is a detail view of the camera clamping screw seen in Fig. 7.

In Figs. 6 and 7 there is shown an apparatus 10b embodying the invention. The same comprises a photographic floodlight holder 65. Said holder comprises a horizontal elongated casing 66 having a front wall 67, a rear wall 68, a bottom wall 69, a top wall 70 and end walls 71. Mounted in the front wall 67 and projecting rearwardly into the casing 66 are a pair of screw threaded lamp sockets 73 to which may be screwed the usual photo floodlights 74. The sockets 73 are suitably connected to a cable 75 extending from the casing and carrying a plug 76 for connection to the usual wall outlet.

Fixed to the center of the casing is a bracket 80 having a portion 81 contacting the underside of the casing, a portion 82 contacting the rear of the casing and a portion 84 contacting the top of the casing. Extending rearwardly from portion 82 is an arm 85 formed with a through opening 86, having a screw threaded portion 87. Mounted on the bar 85 is a clamping member 88 having a head 89 and extending therefrom is a shank 90, the outer end of which is screw threaded as at 91. The threaded portion 91 may be screwed through the threaded portion 87 and thereabove so that member 88 will be rotatably and slidably mounted within the opening 86. A camera 12 or a moving picture camera may be mounted on the top of the bracket 80 and it may be clamped in place by screwing the portion 91 of member 88 into a threaded opening in the bottom of the camera. Fixed to the lower side of the bracket 80 and extending downwardly therefrom is a handle 92. The part of apparatus 10b described to this point is old and well known in the art.

Ordinarily, in use the plug 76 is engaged within an outlet, the apparatus is held by grasping the handle 92 and the camera actuated. However, it has been found that the camera often will turn or have some slight movement relative to the support. To obviate this difficulty, in accordance with the present invention, there is fixed to the top wall 70 of the casing 66 a bar 93. The bar 93 may be riveted, screwed or otherwise attached to the casing. Extending upwardly from the bar 93 is a longitudinal boss 94 and extending upwardly from the center of the boss is a screw threaded stem 95. Slidably mounted on bar 93 is an angle shaped member 96 having a horizontal arm 97 from one end of which extends upwardly a vertical arm 98. The arm 97 is formed in its underside with a recess 99. Said arm 97 is furthermore formed with a longitudinal slot 100 at the middle of the recess, but terminating short of the ends thereof.

The boss 94 is slidably received in the recess 99 and the stem 95 passes through the slot 100. Wing nut 101 screwed on the stem 95 serves to tighten or clamp bracket 96 to the bar 93. It will now be understood that when the nut 101 is loosened, bracket 96 may be slidably moved until the arm 98 contacts one side of the camera. The nut 101 may then be tightened. The bracket 96 thus serves to prevent rotation or turning or movement or shaking of the camera relative to the photo floodlight holder.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. In combination, an angle shaped member having a horizontal arm and a vertical arm extending upwardly therefrom, means to mount a camera on the horizontal arm, means to mount a flash gun on the vertical arm, said horizontal arm being formed with a longitudinal recess and with a longitudinal slot at the bottom of said recess, an angle shaped bracket having a horizontal arm mounted on said first mentioned horizontal arm, a boss extending from the horizontal arm of the bracket and slidably received within said recess, a screw threaded stem extending from the boss and passing through the slot, a nut screwed to said stem, and said angle shaped bracket comprising a vertical arm extending upwardly from the horizontal arm of said bracket and adapted to contact one side of a camera mounted on the horizontal arm of said member.

2. In combination, a support, means to attach a camera to said support, said support being formed with a longitudinal slot, an angle shaped bracket having one arm formed with a longitudinal projection on its bottom slidably mounted on said support, and another arm extending from the first arm and adapted to engage a side of a camera mounted on said support, a screw threaded stem extending from the first arm of said bracket and passing through said slot, and a nut screwed to said stem for clamping said arm to said support.

3. In combination, an elongated member with a recess therein, means to attach a camera thereto, a bracket with a bottom projection slidably and non-rotatably mounted on said member, means to fix said bracket to said member in various longitudinally adjusted positions when said projection rides in said recess, and said bracket having means to engage a side of a camera mounted on said member to prevent movement of said camera relative to said member, and means on said bracket for mounting a flash gun thereon.

4. In combination, a straight bar formed with a hole and with an elongated slot, a camera mounted on the bar, screw threaded means extending through said hole for attaching said camera to said bar, a bracket having an arm with a projecting boss on its underside which fits into the bar slot slidably mounted on said bar, means to attach said arm to said bar, a second arm extending upwardly and perpendicular to the first arm of the bracket and contacting a side of the camera, a third arm extending from the second arm and parallel to the first arm, and a fourth arm extending upwardly from and perpendicular to the third arm, and a flash gun slidably mounted on said fourth arm.

5. A support with a longitudinal recess and slot within said recess, on its upper surface for holding a camera comprising in combination, a first means to engage one surface of said camera for attaching said camera to said support, a second means slidable on said support, and with a longitudinal boss thereon that engages in said slot on said support along a path in a plane parallel to said support, and adapted to be fixed at any point in said path, said second means being further adapted to engage another surface of said camera at an angle to said first mentioned surface, to prevent movement of the camera relative to said support, and a third means for attaching a lamp to said support.

6. A support with a through slot near one end of the upper surface for holding a camera comprising in combination, a first means to engage one surface of said camera for attaching said camera to said support, a second means with a boss extending from the bottom surface thereof slidable on said support, with said boss fitting into said slot and along a path in a plane parallel to said support, and adapted to be fixed at any point in said path, said second means being further adapted to engage another surface of said camera at an angle to said first mentioned surface, to prevent movement of the camera relative to said support, and a third means for attaching a lamp to said support, said second means comprising a bracket formed with one arm parallel to the plane of said support, and a second arm extending from said first arm, for engagement with the second mentioned surface of said camera.

JOSEPH MARKOWITZ.

REFERENCES CITED

The following references are of record in the file of this patent:

UNITED STATES PATENTS

| Number | Name | Date |
| --- | --- | --- |
| 2,261,953 | Brown | Nov. 11, 1941 |
| 2,370,611 | Du Mais | Feb. 27, 1945 |
| 2,479,716 | Bensen | Aug. 23, 1949 |
| 2,511,531 | Hencke | June 13, 1950 |

FOREIGN PATENTS

| Number | Country | Date |
| --- | --- | --- |
| 951,091 | France | Apr. 11, 1949 |